United States Patent [19]

Penard et al.

[11] Patent Number: 4,918,527
[45] Date of Patent: Apr. 17, 1990

[54] DEVICE AND METHOD WITH BUFFER MEMORY, PARTICULARLY FOR LINE/COLUMN MATRIX TRANSPOSITION OF DATA SEQUENCES

[75] Inventors: Pierre Penard, Rennes; Philippe Quenard, Assigne, both of France

[73] Assignees: Etat francais (CNET), Issy Les Moulineaux; Telediffusion de France, Montrouge Cedex, both of France

[21] Appl. No.: 278,678

[22] Filed: Dec. 1, 1988

[30] Foreign Application Priority Data

Dec. 3, 1987 [FR] France .................. 87 16781

[51] Int. Cl.⁴ .................. G06F 15/347; G06F 15/66; H04N 5/76
[52] U.S. Cl. .................. 358/160; 364/239; 364/939; 364/919.2; 364/725; 365/189.04; 358/133
[58] Field of Search ... 364/200 MS File, 900 MS File, 364/725; 365/78, 189.04; 358/133, 160

[56] References Cited

U.S. PATENT DOCUMENTS

| | | | |
|---|---|---|---|
| 3,405,393 | 10/1968 | Haselwood | 364/900 |
| 3,906,453 | 9/1975 | Mattedi et al. | 364/200 |
| 3,922,643 | 11/1975 | Poole | 364/900 |
| 4,272,833 | 6/1981 | Taylor | 365/100 |
| 4,309,755 | 1/1982 | Lanty | 364/200 |
| 4,405,936 | 9/1983 | Peters | 358/13 |
| 4,433,394 | 2/1984 | Torii et al. | 365/78 |
| 4,734,850 | 3/1988 | Torii et al. | 364/200 |
| 4,769,790 | 9/1988 | Yamashita | 365/189.12 |
| 4,831,440 | 5/1989 | Borgers et al. | 358/133 |
| 4,837,724 | 6/1989 | Borgers et al. | 358/133 |
| 4,849,812 | 7/1989 | Borgers et al. | 358/133 |
| 4,860,097 | 8/1989 | Hartnack et al. | 364/725 |

FOREIGN PATENT DOCUMENTS 2082016 2/1982 United Kingdom .

Primary Examiner—Gareth D. Shaw
Assistant Examiner—Gopal C. Ray
Attorney, Agent, or Firm—Barnes & Thornburg

[57] ABSTRACT

The device and method disclosed relate to the field of electronic devices and methods enabling the transposition of any even-order square matrix, the elements of which are given in sequence. The goal is to provide for the transposition of sequences of data representing elementary image blocks, without any duplication of the memory space needed to store an elementary block, in optimizing the two parameters of operating speed and space occupied on silicon. This goal is achieved by a buffer memory divided into two identical storage half-planes, working together with a device for the sequencing of the reading/writing operations, providing simultaneously for a reading operation on one of the storage half-planes and a writing operation on the other half-plane.

4 Claims, 4 Drawing Sheets

FIG.1

| 0 | 1 | 2 | 3 |
|---|---|---|---|
| 4 | 5 | 6 | 7 |
| 8 | 9 | 10 | 11 |
| 12 | 13 | 14 | 15 |

FIG.2

| Time | | Access to memory in 4 cycles | | | | Line/block number | Column/block number |
|------|---|---|---|---|---|---|---|
| | | H | H+1 | H+2 | H+4 | | |
| T+0 | L | 0 | 4 | 8 | 12 | | 1st/k |
| | E | 12 | 13 | 14 | 15 | 4th/k | |
| T+4H | L | 1 | 5 | 9 | 13 | | 2nd/k |
| | E | 0 | 4 | 8 | 12 | 1st/k+1 | |
| T+8H | L | 2 | 6 | 10 | 14 | | 3rd/k |
| | E | 1 | 5 | 9 | 13 | 2nd/k+1 | |
| T+12H | L | 3 | 7 | 11 | 15 | | 4th/k |
| | E | 2 | 6 | 10 | 14 | 3rd/k+1 | |
| T+16H | L | 0 | 1 | 2 | 3 | | 1st/k+1 |
| | E | 3 | 7 | 11 | 14 | 4th/k+1 | |
| T+20H | L | 4 | 5 | 6 | 7 | | 2nd/k+1 |
| | E | 0 | 1 | 2 | 3 | 1st/k+2 | |
| T+24H | L | 8 | 9 | 10 | 11 | | 3rd/k+1 |
| | E | 4 | 5 | 6 | 7 | 2nd/k+2 | |
| T+28H | L | 12 | 13 | 14 | 15 | | 4th/k+1 |
| | E | 8 | 9 | 10 | 11 | 3rd/k+2 | |
| T+32H | L | 0 | 4 | 8 | 12 | | 1st/k+2 |
| | E | 12 | 13 | 14 | 15 | 4th/k+2 | |

DEVICE AND METHOD WITH BUFFER MEMORY, PARTICULARLY FOR LINE/COLUMN MATRIX TRANSPOSITION OF DATA SEQUENCES

FIELD OF THE INVENTION

The field of the invention is that of electronic devices and methods capable of providing for the transposition of any even-order square matrix, the elements of which are given sequentially.

More precisely, the function of the device according to the invention is to accomplish the processing of a flow of data in a specific buffer memory, where this processing consists in making a line/column transposition of word sequences, representing matrices of data, in the stream of data processed.

DESCRIPTION OF THE PRIOR ART

This device can be preferably applied in the field of video information compression. For, numerous methods for the encoding of video information are based on a preliminary operation for the functional conversion of the image. The conversion of the image generally concerns elementary image blocks, namely matrices of adjacent dots resulting from a cutting up of the screen by means of a cutting up grid. Each elementary block then undergoes specific processing and encoding, for example to obtain a compression of information.

A commonly used encoding process consists in performing a discrete cosine transform (DCT), and is particularly suitable because of its functional conversion qualities as well as because there are algorithms enabling it to be implanted in wired form. Now, the application of a DCT processing method implies the successive performance of a "line" DCT and then a "column" DCT on each matrix block of images.

One of the preferred applications of the invention, therefore, is to provide a buffer memory device which can be used to accomplish an operation for the transposition of elementary image blocks, given in the form of a stream of data sequences between a "line" DCT processing operation and a "column" DCT operation.

DESCRIPTION OF THE PRIOR ART

There already exist known buffer memory devices and methods used to perform this type of transposing operation.

In these known systems, just as in the invention, the operating principle consists in writing a source sequence, representing an elementary matrix image block (sub-image), in a specific memory location, and then in reading the data thus memorized, in a certain order which is different from the writing order, so as to obtain transposed sequence of the block of images at output.

A first prior art device consists in using two distinct memories. The source sequence $S^i$ is read in one of the memories while the sequence $S^{i-1}$ is read, in a transposed way, in a second memory and so on, alternately, for the sequences $S^{i+1}$, $S^{i+2}$ etc.

According to this device and method of transposition, high-speed processing is obtained but a large amount of memory space is taken up. For, the available memory capacity on silicon has to correspond to the volume of data of two elementary image blocks.

According to a second known method described, for example in the prior British patent, GB-A2 082 012 (NV PHILIPS), it is possible to used only one memory in which, successively and alternately, a source sequence is written and then the transposed reading is done of the corresponding transposed sequence.

This second method has the advantage halving the space occupied. By contrast, it has the drawback of also greatly reducing the maximum operating speed of the transposing operation.

In another known alternative method, described in the U.S. patent document US-A-3 922 634 (Poole), applied to the block-by-block compression of telephone signals, both a reading and a writing operation are performed on the memory, during each addressing cycle, in distinct sequences. However, the working of this device makes it is necessary for each data block to be completely written before its reading can be started.

MAIN PURPOSES OF THE INVENTION

It can be seen that it will be more advantageous to be able to obtain an overlapping of the operations for reading and writing each block in the buffer memory. This is the purpose of the invention, which is designed to enable the simultaneous obtaining of optimum speed and minimum space occupied for transposition.

More precisely, a first goal of the invention is to optimize both parameters, namely operation speed and space occupied on silicon, at the same time, by means of one and the same buffer memory.

Another goal of the invention is to provide a memory architecture, and a method for addressing a memory of this type, when reading and writing, providing for the transposition of data sequences, especially sequences representing elementary image blocks subjected, for example, to two-dimensional DCT processing. The device and method of the invention enable the transposition to be done in real time without any duplication of the memory space needed for the storage of an elementary sub-image block.

SUMMARY OF THE INVENTION

These goals are achieved by means of a buffer memory device, particularly for the line/column matrix transposition of word sequences of $(n \times n)$ words (n being an even whole number) of the type of elementary image blocks used in digital television, each source sequence being converted into a transposed sequence, wherein said buffer memory is distributed into two identical storage half-planes, each provided with individual reading/writing means, and wherein the addressing means work together with means for the sequencing of the reading/writing operations of said storage half-planes, said sequencing means being means to control the performance of a succession of pairs of reading/writing operations, each pair simultaneously comprising a reading operation on one of said storage half-planes, and a writing operation on the other half-plane.

Advantageously, the sequencing means include means to generate an addressing cycle, said addressing cycle being formed by a succession of two alternated, elementary addressing cycles, respectively for the filling of words in the buffer memory and for the reading of the words loaded in the buffer memory, each source sequence being loaded alternately, according to one and then the other elementary addressing cycle, the corresponding transposed sequence being read according to the opposite elementary addressing sequence.

Another object of the invention is a method for the matrix line/column transposition of sequences of (n×n) words, notably of the type corresponding to elementary image blocks used in digitalized television, by means of a buffer memory device receiving a source sequence at input and giving the corresponding transposed sequence at output, a method wherein, said buffer memory being formed by two identical storage half-planes, each associated with individual reading/writing means, said method consists in:

filling the buffer memory in the order of occurrence of the words of each of said source sequences by selectively recording each word in one of said memory half-planes so as to enable:

the reading of each transposed sequence in said buffer memory, in selectively reading, in the transposed order, each current word of the transposed sequence in the storage half-plane in which it has been loaded, said individual reading/writing means working simultaneously so as to achieve an operation for the reading of the current word of the current transposed sequence in one of the storage half-planes, and to achieve a writing of the current word of the current source sequence in the other storage half-plane.

In this way, the said filling-in operation is performed by allocating the even-parity words of the source sequence to a first storage half-plane, and the odd-parity words of the source sequence to the second half plane while taking care to permutate the parity allocation that devolves on each storage half-plane, whenever the order of the current word of the source sequence is a multiple of the base n of the sequence.

BRIEF DESCRIPTION OF THE DRAWINGS

Other features and advantages of the invention will emerge from the following description of preferred embodiments of the invention, given by way of illustration, and from the appended figures, of which:

FIG. 1 shows the organization of addresses of an elementary 4×4 block of images in a transposition buffer memory according to the invention;

FIG. 2 is a summary table of memory accesses (reading and writing) for some cycles for transposition of elementary blocks k, k+1, k+2, by means of a buffer memory of the type shown in FIG. 1;

DESCRIPTION OF PREFERRED EMBODIMENTS

Figure 3:
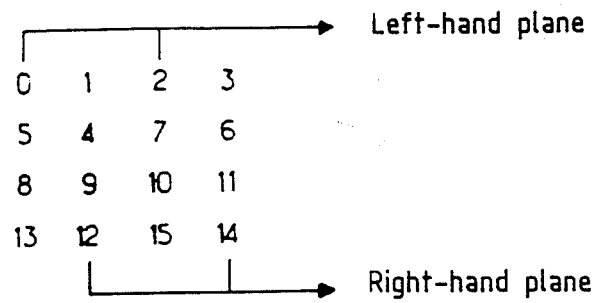
FIG. 3 shows a schematic view of the breakdown of the buffer memory of FIG. 1 into two parallel planes.

The working of the 4×4 and 8×8 embodiments of the transposition memory shown in the drawings complies with two principles of design and operation:

in order to enable the simultaneous achievement of a reading operation and a writing operation in the memory, this memory is divided into two planes each having their own reading and writing device;

in order to prevent conflicts over access to reading/writing operations, the implementing of the invention requires a de-correlation of the order for addressing words in the buffer memory from their order numbers in the square block of images of the corresponding source.

Figure 4:
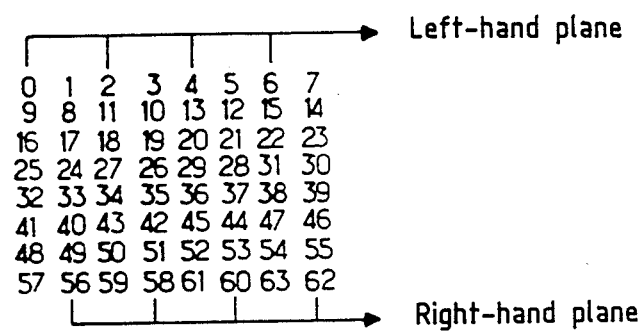
FIG. 4 illustrates an embodiment of the transposition buffer memory according to the invention for elementary 8×8 blocks.
Figure 5:
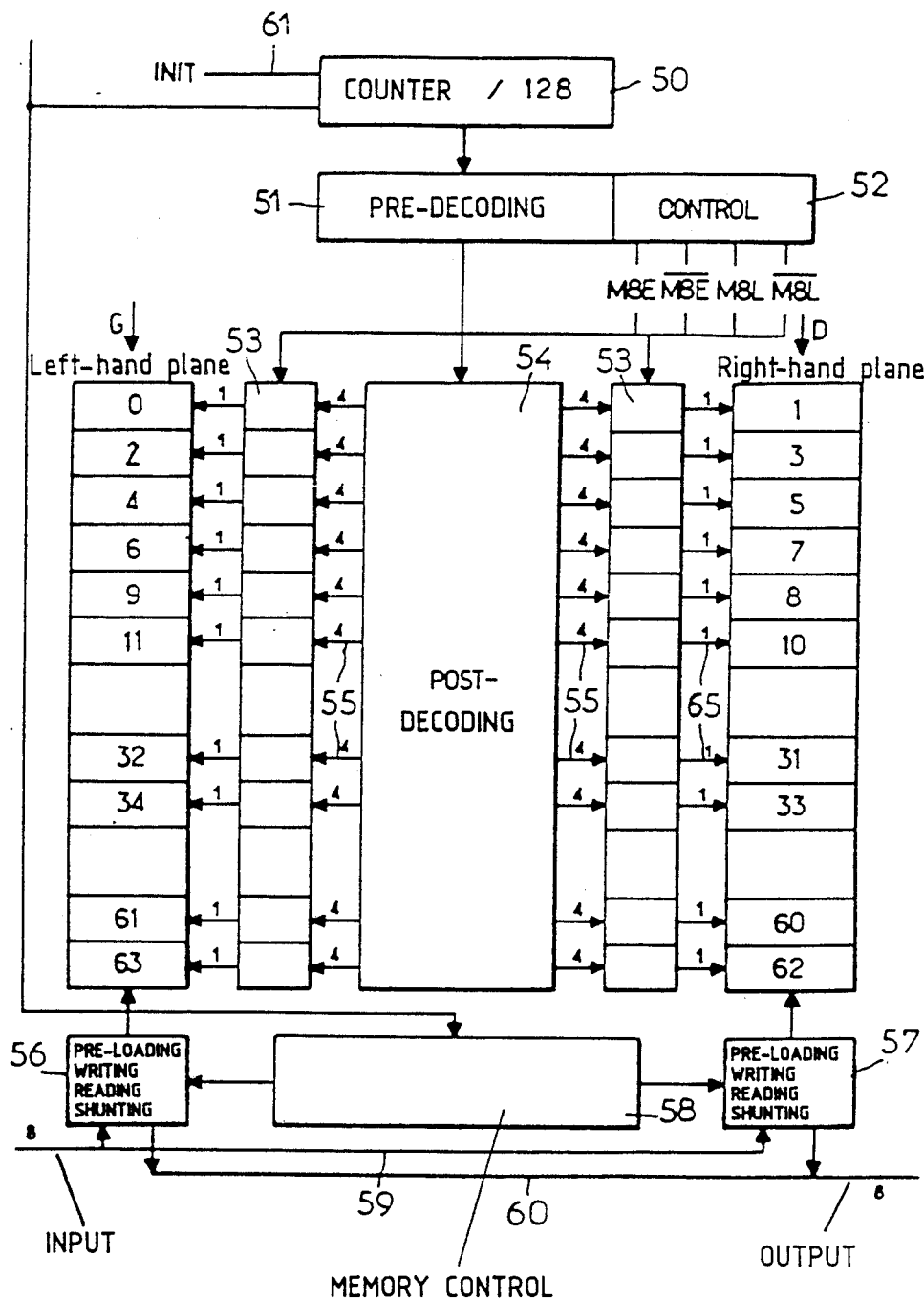
FIG. 5 is a block diagram showing the principle of operation of an 8×8 transposition memory device according to the invention.

The first principle shall be illustrated more particularly by the description of FIGS. 3, 4 and 5.

The second principle shall be illustrated more particularly below with reference to the description of the 4×4 transposition memory of FIG. 1.

Example 1: 4×4 transposition memory.

The organization of the addresses of a 4×4 block and, therefore, the arrangement of the words in a matrix depiction of the transposition memory according to the invention, is as shown in FIG. 1.

This arrangement complies with the two principles laid down above:

at initialization, the words received are written by scanning the matrix from left to right and from top to bottom, at the addresses: 0-1-2-3-4-5-6-7-8-9-10-11. As soon as the word $X^{12}$ has been written at the address 12, it is possible to start reading the first column of the block and, therefore, to simultaneously achieve a reading and writing of data;

the addresses of the words stored in the memory are de-correlated from their order numbers in the sequence representing the source images block as follows: the addresses of the words of the odd-parity lines of the matrix memory are permutated two by two. It will be easily ascertained that the sequencing and organization of addresses proposed judiciously avoids any simultaneous access, in reading and writing, to words of addresses with the same parity within the memory.

The working of the device according to the invention will be followed more easily from the table of FIG. 2.

Each line of the table corresponds to the performance of a series of four elementary reading/writing cycles in the memory transposition device according to the invention.

The stage for initialization of the operation is not shown schematically, and the first line of the table corresponds to the start of the transposed reading of a block of images k.

During the first series of four elementary cycles (T+H to T+4H), the following operations for access to the memory are performed:

in reading: 0 then 4, 8, 12 corresponding to the transposed reading of the block of images k, namely the reading of the matrix memory along the columns (whereas the prior writing of the block k was made linewise in the memory), and simultaneously:

in writing: 12 then 13, 14, 15, namely the last line of the block of images k written from the source sequence feeding the memory.

During the series of four following elementary cycles, the "line" data coming from the source sequence from the images block "k+1" are written in the "column" released by the reading of the first series of the transposed sequence of the block k, namely:

in writing: O, then 4, 8 12, and, simultaneously, the transposed reading of the block k is continued:

in reading: 1, then 5, 9, 13, and so on in accordance with the table of FIG. 2.

In examining the sequencing of the reading/writing operations in detail, it may be noted that a natural splitting of the memory into an odd-parity half-plane and an even-parity half-plane causes conflicts relating to access: for example, in T+O), a writing of the word 0 has to be done and, simultaneously, a writing of the word 12, which is of the same parity and is, therefore, physically located in the same storage half-plane. This anomaly is coped with by using the organization proposed in FIG. 3, wherein the words of the odd parity lines of the matrix are permutated in two by two.

In other words, and more generally, the organization of the transposition memory according to the invention consists in splitting said memory into two half-planes containing words, the address of which has the same parity while, nonetheless, increasing this parity each time that the address is increased modulo the base of the matrix.

Example of an 8×8 transposition matrix memory.

The implantation of addresses in an 8×8 matrix memory according to the invention is shown in FIG. 4.

The organization of the addresses follows the same principle as that of the 4×4 memory described above.

The addresses of the words of the odd-parity lines are permutated two by two. More generally, the proper functioning of the system is ensured once the words are at the same parity on all the diagonals of a block, or when any word of a block is surrounded by neighbouring "lines" and "columns" of opposite parity.

This solution is the simplest one from the viewpoint of the logic design of the addresses decoder of the memory.

In fact, this rule can be applied to any matrix (n×n) with n: even number. A block diagram representing a concrete embodiment of an 8×8 memory according to the invention is shown in FIG. 5.

In the block diagram of FIG. 5, it is possible to distinguish:
a six-bit binary counter 50 giving the 128 characteristic addresses of a full cycle (64 reading operations and 64 writing operations).
logic circuits 51, 52 which implement a predecoding-/post-decoding system of addresses, enabling a reduction in the number of inputs of the gates needed for decoding and, consequently, the number of transistors.

Figure 6:
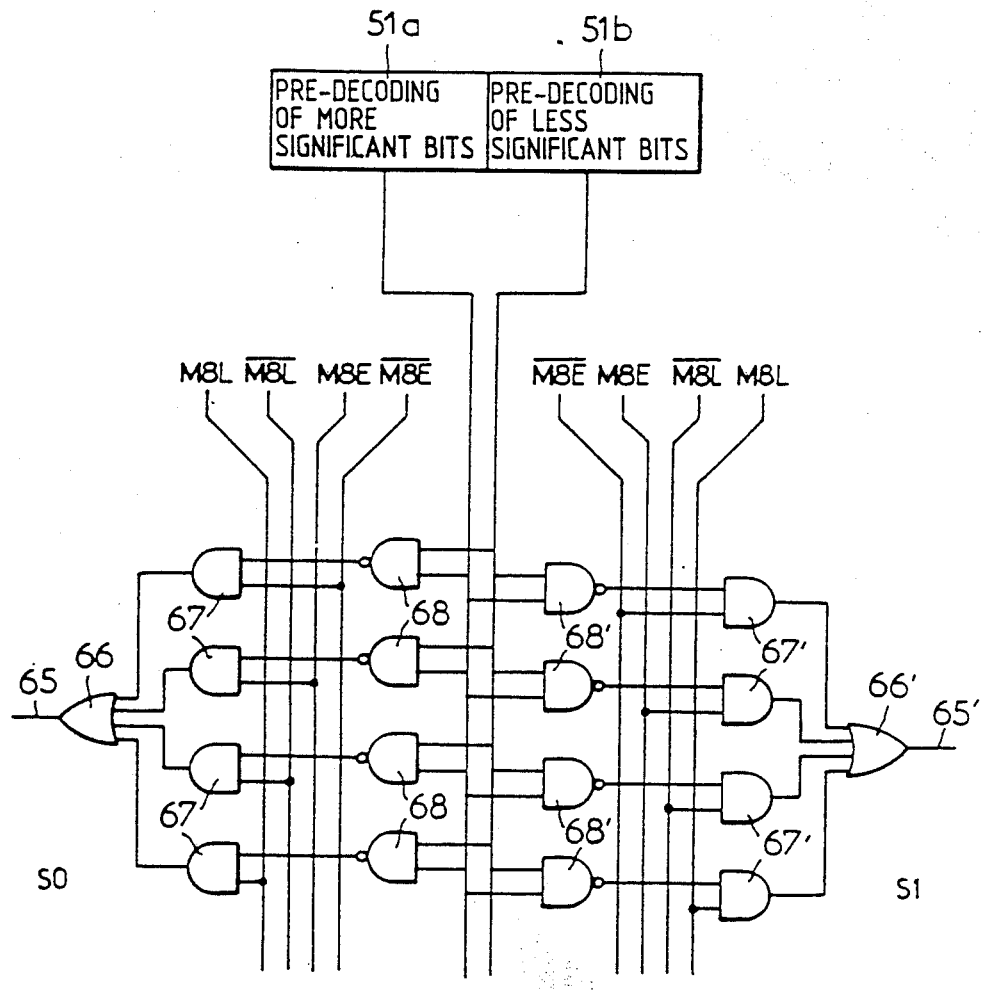
FIG. 6 a diagram of a section of a decoder of the device of FIG. 5.

The working of this technique is given in greater detail further below, in relation to FIG. 6 showing a diagram of a section 53 of the decoder.

The analysis of the unfolding of a sequence shows that the access to each memory word can be broken down logically on the basis of the following signals:
a counting cycle, in steps of 1, in reading;
a counting cycle, in steps of 1, in writing;
a counting cycle, in steps of 8, in reading;
a counting cycle, in steps of 8 in writing;

These different signals M8E, M8L and their complements M8EB, M8LE are given by the control logic circuit 52 from data given by the counter 50.

Figure 7:
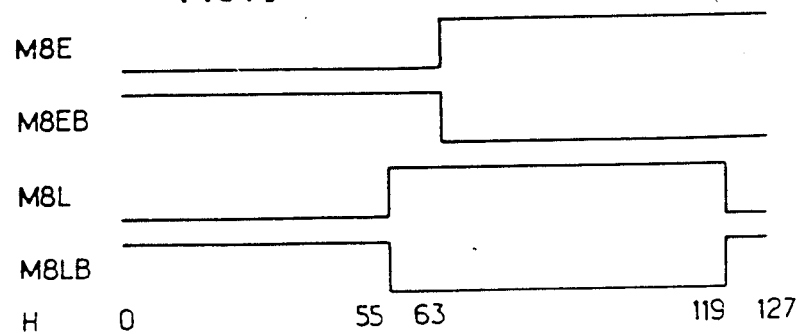
FIG. 7 is a timing diagram of the validation signals of the decoder section of FIG. 6.

FIG. 7 shows the timing diagram of the enabling signals M8E, M8L, M8ED, M8LB. It is seen that the overlapping of the signals lasts for eight clock periods in the case of an 8×8 matrix.

In this way, the sequencing of the memory access is provided by the circuits 53 corresponding to each address of the memory, both in the right-hand plane and the left-hand plane. These circuits 53 receive as inputs, firstly, signals coming from the pre-decoding circuit 51 and the post-decoding circuit 54 and, secondly, the control signals coming from the logic circuit 52. These circuits 53 simultaneously give a signal, in each storage half-plane, for the selection of the word to be read and the word to be written. The following operations will then be performed by means of the units 56 and 57, under the control of the memory control circuit 58 : an operation to stop the pre-charging of the memory, an operation for reading or writing and an operation for shunting the data by selective commutation of the input/output of the storage halfplanes to the input bus 59 and output bus 60.

The source sequences of image blocks transit through the input bus 59, and the transposed sequences, read in the memory, are conveyed to the output bus 60.

FIG. 6 gives a detailed view of a preferred embodiment of the logic circuits 53 corresponding to a section of the decoder of FIG. 5.

The signal 65, 65', corresponding to each memory word of the transposition memory, is given by an OR circuit receiving four input signals coming from four AND circuits 67, 67'.

Each of the AND circuits 67, 67' receives two inputs:
one input connected with one of the control signals M8E, M8L, M8EB, M8LB coming from the logic circuits 52, and,
one input coming from a NAND circuit 68, 68'. Each of the NAND circuits is itself connected to the output of the half-circuits 51a 51b for the pre-decoding of more significant and less significant bits of the counter 50 signals. Each of the pre-decoding half-circuits receives three wires of addresses coming from a binary counter and gives the $2_3$ (namely 8) possible combinations of these three values of addresses.

Application to a transposition operation between "line" DCT and "column" DCT.

The 8×8 transposition memory of FIG. 5 may contain 64 12-bit words, and can be used to accomplish the operation for transposing an 8×8 block having undergone a "line" DCT (discrete cosign transform) and having to undergo a "column" DCT.

Reading and writing access is achieved simultaneously at the pace of the clock controlling the counter 50 of FIG. 5.

The memory is controlled by an initializing signal "INIT" 61 which indicates the presence of the first word of a 64-word source sequence, forming an 8×8 pixel sub-image, at the input of the memory. The transposed sequence of the corresponding transposed block is available at the output, with a delay of 56 elementary clock cycles.

As already noted above, the working principle of this device consists in alternately filling in the memory in lines and then in columns, by source sequences of 64 words coming from the line DCT operator, and in conjointly doing the columnwise reading and then the linewise reading of the data stored in the transposition memory, towards the column DCT operator.

As already mentioned, it is in fact possible to read the first column of a block k of 64 pieces of data as soon as the word $X_{56}$ is written in the memory, and to do so without disturbing the cyclical operation modulo 8 of the device. Thereafter, the content of the first column can be read in series ($X_0$, $X_9$, $X_{16}$...$X_{57}$ while, at the same time, the last line of the block can be written.

The device according to the invention therefore makes it possible to accomplish the intermediate transposing operation during a two-dimensional DCT processing operation on blocks of images of n×n pixels, with n as an even number, without duplicating the memory space needed for the storage of a subimage, and with high processing speed.

What is claimed is:

1. A buffer memory device, particularly for the line/column matrix transposition of word sequences of (n×n) words (n being an even whole number) of the type of elementary image blocks used in digital television, each source sequence being converted into a transposed sequence, wherein said buffer memory is divided into two identical storage half-planes, each provided with individual reading/writing means, and addressing means cooperating with means for sequencing of the reading/writing operations of the storage half-planes, said sequencing means for controlling the execution of a succession of pairs of reading/writing operations, each pair simultaneously comprising a reading operation on one of said storage half-planes, and a writing operation on the other half-plane, said sequencing means comprising means for generating an addressing cycle, said addressing cycle consisting of a successing of two alternated, elementary addressing cycles for the filling and reading of words loaded in the buffer memory, respectively, each source sequence being loaded in alternation, in one and then in the other elementary addressing cycle, the corresponding transposed sequence being read according to the opposite elementary addressing cycle.

2. A device according to claim 1, wherein said buffer memory has a capacity of (n×n) words.

3. A method for the matrix line/column transposition of sequences of (n×n) words, notably of the type corresponding to elementary image blocks used in digitalized television, by means of a buffer memory device receiving a source sequence at input and giving the corresponding transposed sequence at output, a method wherein, said buffer memory being formed by two identical storage half-planes, each associated with individual reading/writing means, said method consists in: filling the buffer memory in the order of occurrence of the words of each of said source sequences by selectively recording each word in one of said memory half-planes so as to enable:

the reading of each transposed sequence in said buffer memory, in selectively reading, in the transposed order, each current word of the transposed sequence in the storage half-plane in which it has been loaded, said individual reading/writing means working simultaneously so as to achieve an operation for the reading of the current word of the current transposed sequence in one of the storage half-planes, and to achieve a writing of the current word of the current source sequence in the other storage half-plane.

4. A method according to claim 3, wherein said filling-in operation is performed by starting with the allocation of each even-parity word of the source sequence to a first storage half-plane, and each odd-parity word of the source sequence to the second half plane and in then permutating the parity allocation that devolves on each storage half-plane, whenever the order of the current word of the source sequence is a multiple of the base n of the sequence.

* * * * *